United States Patent [19]

Kiesewetter et al.

[11] Patent Number: 5,358,561
[45] Date of Patent: Oct. 25, 1994

[54] USE OF WATER-SOLUBLE SULPHOALKYL DERIVATIVES OF CELLULOSE IN GYPSUM-AND CEMENT-CONTAINING COMPOUNDS

[75] Inventors: René Kiesewetter, Soltau-Ahlften; Klaus Szablikowski, Walsrode; Werner Lange, Visselhövede, all of Fed. Rep. of Germany

[73] Assignee: Wolff Warlsrode AG, Walsrode, Fed. Rep. of Germany

[21] Appl. No.: 9,536

[22] Filed: Jan. 27, 1993

[30] Foreign Application Priority Data

Feb. 7, 1992 [DE] Fed. Rep. of Germany ....... 4203530

[51] Int. Cl.$^5$ .................. C04B 16/02; C04B 24/38; C08B 11/193
[52] U.S. Cl. .................. 106/805; 106/726; 106/780; 106/781; 106/809; 106/823; 536/90; 536/91; 536/92; 536/95; 536/96; 536/97; 536/98; 536/99; 536/100
[58] Field of Search .......... 106/805, 809, 726, 780, 106/781, 823, 169; 536/90, 91, 92, 95, 96, 97, 98, 99, 100

[56] References Cited

U.S. PATENT DOCUMENTS

| 2,583,657 | 1/1952 | Lea et al. | 106/809 |
|---|---|---|---|
| 2,891,057 | 1/1959 | Porath | 106/805 |
| 4,650,863 | 3/1987 | Felcht et al. | 536/90 |
| 5,001,232 | 3/1991 | Herzog et al. | 536/90 |
| 5,177,199 | 1/1993 | Kiesewetter et al. | 536/90 |
| 5,182,380 | 1/1993 | Breckwoldt et al. | 536/90 |

FOREIGN PATENT DOCUMENTS

| 0161607 | 11/1985 | European Pat. Off. . |
|---|---|---|
| 0319865 | 6/1989 | European Pat. Off. . |
| 0470444 | 2/1992 | European Pat. Off. . |
| 0511540 | 11/1992 | European Pat. Off. . |
| 0487988 | 6/1993 | European Pat. Off. . |
| 3406745 | 9/1984 | Fed. Rep. of Germany . |
| 2138014 | 10/1983 | United Kingdom . |

*Primary Examiner*—Anthony Green
*Attorney, Agent, or Firm*—Sprung Horn Kramer & Woods

[57] ABSTRACT

The invention relates to water-soluble ionic cellulose derivatives and their use as additives for gypsum- and cement-containing compounds.

8 Claims, No Drawings

USE OF WATER-SOLUBLE SULPHOALKYL DERIVATIVES OF CELLULOSE IN GYPSUM-AND CEMENT-CONTAINING COMPOUNDS

The invention relates to water-soluble ionic cellulose derivatives and their use as additives for gypsum- and cement-containing compounds.

Water-soluble cellulose ethers, such as hydroxyethyl cellulose (HEC), hydroxypropyl cellulose (HPC), methyl cellulose (MC) and mixed ethers thereof have already for a long time been indispensible processing aids for various building materials. Their field of application ranges from the masonry and rendering system of the external wall through gypsum plaster, cement plaster and joint fillers as far as to knifing fillers.

The cellulose ethers used to improve the processibility of plaster systems are mainly nonionic in nature. For the processing of gypsum, lime and cement systems, methyl celluloses in particular or their hydroxyalkyl cellulose mixed ethers are used. In this connection, an overriding importance attaches to control of the water balance in plaster systems, since this influences the processibility, the plasticity, the setting behaviour, the adhesiveness, the "open time", the air void content, the non-sag properties etc.

For an improvement of the rheological property profile of the commercially available, nonionic ellulose ethers, such as e.g. of hydroxyethyl cellulose, extremely varied water-repellency treatments have been carried out (see e.g. U.S. Pat. Nos. 3,091,542, 3,272,640, 3,435,027, DE-OS 2,120,439). The reaction of a hydroxyethyl cellulose with compounds transferring long-chain alkyl groups or 3-alkoxy-2-hydroxypropyl groups and their use in the building materials sector alone or mixed with methyl cellulose-derivatives (e.g. DE-OS 30 20 689, DE-OS 30 04 161, U.S. Pat. Nos. 4,845,207, 4,784,693, DE-OS 39 09 070, EP 0 362 769), with the objective of an improved rheological property profile has not so far led to the hoped-for result. Moreover e.g. the attachment of long-chain alkyl groups to the cellulose chain or to hydroxyethyl cellulose is subject to very poor yields, so that high product costs, among other things, are the result.

The use of ionic cellulose ethers as additives for mortar compounds, knifing fillers and/or plaster compounds based on gypsum and/or cement is not new per se. From U.S. Pat. No. 2,844,480, EP 0 269 015, U.S. Pat. Nos. 4,707,187, 4,462,837, 3,446,795, 4,707,188, 2,852,402 and DE 3 126 489, e.g. methyl carboxymethyl cellulose ethers and carboxymethyl hydroxyalkyl cellulose ethers are known which are used as mortar additives, additives for underwater concrete and as water-reducers for geological formations. Accordingly, e.g. an addition of 0.05–1% carboxymethyl hydroxyethyl cellulose leads to an improvement of the processibility of the plaster system, which, compared with a commercial methyl hydroxypropyl cellulose (MHPC) or methyl hydroxyethyl cellulose (MHEC), should manifest itself in the form of an easier processibility based on a reduced air void content. A disadvantage in this connection, however, is the strongly liquefying action on the plaster system. The easier processibility then achieved is therefore accompanied by definitely worse non-sag properties, compared with an ordinary commercial MHEC or MHPC.

The reaction of a carboxymethyl cellulose with ethylene oxide, propylene oxide or methyl chloride certainly leads to an improvement of the stability to salt, alkali and acid. But a general incompatibility with in particular multivalent cations (e.g. $Ca^{2+}$, $Al^{3+}$) cannot be completely eliminated. Strong gelation or flocculation can be the result (L. Brandt in: Ullmanns Encyclopedia of Industrial Chemistry, Vol. 5 A, Verlag Chemie, Weinheim/N.Y., 1986, p. 479 ff, see also DE-OS 3 126 489 and W. Hansi in Dtsch. Farben Ztschr. 25, 1971, p. 493 ff).

The objective is therefore to produce and use as an auxiliary agent a cellulose ether that avoids the aforementioned disadvantages, that can be produced simply and in good yields, and has an improved water retention value compared with the commercially available cellulose ethers (HEC, MHEC, MHPC), which in turn results in an improvement of application technology parameters (e.g. non-sag properties, "open time" etc.).

It has now been found that water-soluble sulphoalkyl-modified cellulose derivatives with hydroxyethyl, hydroxypropyl, hydroxybutyl, dihydroxypropyl, alkyl, especially methyl, aryl, especially phenyl, arylalkyl, especially benzyl and/or alkoxy- hydroxyalkyl, especially 3-alkoxy-2-hydroxyalkyl, groups as substituent have surprisingly improved properties compared with those gypsum and cement compounds that contain as additives conventional nonionic derivatives of methyl cellulose, hydroxyalkyl and/or methyl hydroxyalkyl cellulose.

The cellulose derivatives used according to the invention are completely soluble in water, decisively improve the water retention value of the plaster system and can be prepared according to one of the processes described below either by modifying a cellulose ether (e.g. MC, HEC, SEC) or directly from cellulose.

The following compounds can be used for the modification with reagents transferring sulphoalkyl groups:

| | |
|---|---|
| hydroxyethyl cellulose | (HEC), |
| hydroxypropyl cellulose | (HPC), |
| hydroxybutyl cellulose | (HBC), |
| dihydroxypropyl cellulose | (DHPC), |
| methyl cellulose | (MC), |
| methyl hydroxypropyl cellulose | (MHPC), |
| methyl hydroxyethyl cellulose | (MHEC), |
| methyl hydroxybutyl cellulose | (MHBC), |
| ethyl cellulose | (EC), |
| hydroxypropyl hydroxyethyl cellulose | (HPHEC), |
| hydroxyethyl hydroxybutyl cellulose | (HEHBC) |

The above compounds can be modified as simple, binary or ternary cellulose ethers and as mixtures of different cellulose ethers by compounds transferring sulphoalkyl groups, especially sulphoethyl groups. For an improvement of the rheological behaviour, a reaction with compounds transferring alkyl-, hydroxyalkyl-, aryl-, arylalkyl-and/or 3-alkoxy-2-hydroxyalkyl groups is possible before but especially after the reaction with compounds transferring sulphoalkyl groups. The reagents used for the modification of the cellulose or cellulose derivatives are bonded to the substrate via a urethane, ester, but especially an ether bond.

The anionic cellulose derivatives according to the invention have average degrees of substitution (DS) by sulphoethyl groups of 0.001–0.6, preferably of 0.01–0.5. The average degree of substitution (DS) by alkyl, aryl, or arylalkyl groups is DS=0.0001–2.5, especially 0.001–2.0. The average degree of substitution (MS) of the compounds reacting with catalytic amounts of alkali (e.g. epoxides, glycidyl ethers) is MS=0.0001–5, especially 0.001–4. The average degree of polymerization of the cellulose derivatives is between ca. 30 and ca. 4,000, especially between 1,000 and 2,500.

The sulphoalkyl-substituted cellulose derivatives used according to the invention are produced on the basis of the aforementioned cellulose ethers, but especially on the basis of sulphoethyl cellulose (SEC), preferably in presence of organic solvents. Used as suspending agents are aromatic and/or aliphatic hydrocarbons, ketones, sulphoxides, cyclic ethers or lower alcohols with preferably 2–5 carbon atoms per molecule as well as mixtures of these solvents. Preferably isopropanol and/or 2-methyl-2-propanol (tert-butanol) or mixtures thereof are used.

The cellulose derivatives used according to the invention can also be produced directly from cellulose. A hydrophobically-modified hydroxyethyl sulphoethyl cellulose can be produced, e.g. by first adding the cellulose to a mixture of an inert organic suspending agent and an alkali metal hydroxide. The reagent transferring sulphoalkyl groups, especially sodium vinylsulphonate, is then added and reacted with the alkali cellulose. When the reaction is complete the alkali is optionally neutralized or extracted with aqueous-organic solvent mixtures. However, a part of the alkali used can optionally remain in the product and be used for further reactions. The sulphoalkyl cellulose, especially sulphoethyl cellulose can optionally be worked up in the manner known in cellulose chemistry (see e.g. K. Engelskirchen, in Houben-Weyl's "Makromolekulare Stoffe", Band E 20/III, p. 2,051 ff, editors A. Barth, J. Falbe, Georg Thieme Verlag/Stuttgart 1987) and optionally can be suspended in a mixture of an inert organic suspending agent and an alkali metal hydroxide and reacted with ethylene oxide. The optional subsequent reaction with further reagents—as e.g. propylene oxide, n-butylglycidyl ether, methyl chloride or benzyl chloride—is preferably carried out in an inert organic suspending agent. After completion of the reaction, the amounts of alkali possibly still present can be neutralized or extracted with an organic-aqueous solvent mixture. The product is worked up in the known manner and is used as additive for gypsum- and cement-containing compounds.

The anionic water-soluble products have degrees of sulphoalkyl, especially sulphoethyl, substitution of 0.001–0.6, especially 0.01–0.5. The fluidity, or the water retention value, of the sulphoethylated cellulose derivatives is determined essentially by the degree of sulphoethyl substitution. A degree of substitution with respect to sulphoethyl groups of >0.6 is not useful for applications in systems which require a non-sag property, since there is then an increasing liquefying action and an accompanying impaired non-sag property of the plaster system.

Preferred compounds transferring sulphoalkyl groups are chloroethanesulphonic acid, bromomethanesulphonic acid, vinylsulphonic acid and their salts, especially salts of vinyl sulphonic acid, especially their sodium salts.

Used as starting materials are ground celluloses, especially linters, softwood sulphite, softwood sulphate or hardwood celluloses. Likewise usable as starting materials are commercially available cellulose ethers, as e.g. hydroxyethyl or hydroxypropyl celluloses, methyl or methyl hydroxyethyl or methyl hydroxypropyl cellulose ethers, ethyl hydroxyethyl cellulose and ethyl cellulose.

The production of the sulphoethyl-substituted cellulose derivatives is preferably carried out in a cylindrical reaction vessel which is provided with a suitable agitator unit and ensures a sufficient intermixing of the heterogeneous reaction mass. The reaction vessel is preferably closed in order to enable the reaction to be conducted under a nitrogen atmosphere. An adequate means of bringing the vessel to a certain temperature is preferably also available.

The process consists of the following reaction steps:

a) Reaction of cellulose or a cellulose derivative with alkali in presence of at least one etherification agent (a sulphoalkylating agent—as e.g. sodium vinylsulphonate—and/or a compound transferring hydroxyalkyl groups—as e.g. ethylene oxide—and/or a hydrophobing agent—as e.g. n-butyl glycidyl ether), that requires at least a catalytic amount of a base.

b) Optionally further etherification with at least one etherification agent (a compound transferring hydroxyalkyl groups, a sulphoalkylating agent, or a hydrophobing agent).

c) Optionally neutralization and work-up by extraction with aqueous-organic solvent mixtures or—if the products have thermal flocculation points—by means of hot water.

Preferably used as compounds transferring hydroxyalkyl groups are ethylene oxide (EO), propylene oxide (PO), butylene oxide (BO) and glycidol. Used as sulphoalkyl etherification agents are halogenoethanesulphonic acid or vinylsulphonic acid, especially sodium vinylsulphonate. Hydrophobing agents are epoxides (e.g. propylene oxide, butylene oxide, styrene oxide, cyclopentene oxide, cyclohexene oxide), alkyl halides (e.g. methyl chloride, ethyl chloride), arylalkyl halides (e.g. benzyl chloride) and reagents transferring aryloxy- or alkoxy-hydroxyalkyl or -hydroxyaryl or -hydroxyalkylaryl, especially 3-alkoxy-2-hydroxypropyl groups (e.g. isopropyl glycidyl ether, n-butyl glycidyl ether, 2-ethylhexyl glycidyl ether, allyl glycidyl ether).

The sulphoethyl-substituted cellulose derivatives have viscosities of 5–60,000 mPa.s (measured in 2 wt % aqueous solution at a shear rate of $D=2.5$ $s^{-1}$ at 20° C.). The viscosity grades of the product can be adjusted by the exclusion or addition of oxidizing substances, as e.g. air, $H_2O_2$ or metal oxides, and selection of the celluloses used, which have different average degrees of polymerization.

The alkalization of the cellulose or of the cellulose ether is usually carried out with an alkali metal hydroxide, especially sodium hydroxide, which is used in solid or dissolved form (as aqueous alkali metal hydroxide solution for example in 18–50 wt % form).

In order to obtain uniformly etherified products and to avoid local overheating, the alkalization of the cellulose or of the cellulose ether and the subsequent reaction, which is performed with at least one etherification agent, is preferably carried out in presence of organic solvents.

The etherification agents (alkylene oxide, sodium vinylsulphonate and hydrophobing agents) can be fed together and react with the alkali initially at preferably 10°–60° C. and then at 40°–120° C. and 0.5–6 h reaction time. Preferably the sodium vinylsulphonate, preferably with organic solvents, can first be reacted with the alkali cellulose, and the following mixed etherification can be carried out with or without purification or neutralization of the sulphoethyl cellulose produced in the first stage. In particular the content of alkali is reduced after the first etherification stage by neutralization or extraction with aqueous-organic suspending agents and caustic soda solution still available is advantageously used for the second etherification stage.

The further reaction with alkylene oxides and/or hydrophobing agents can be carried out in presence or absence of organic solvents at temperatures of initially 10°–60° C. and later of 40°–120° C. and 0.5–6 h reaction time.

On the other hand, the etherification can also be carried out by reacting cellulose in the first etherification stage with an alkylene oxide and a hydrophobing agent and subsequently reacting the sodium vinylsulphonate at 40°–120° C. preferably in inert organic suspending agents, especially isopropanol and/or tert-butanol. A subsequent reaction with further alkylene oxides and/or hydrophobing agents is optionally possible.

The product so obtained is optionally neutralized and separated from the optionally present slurry medium and freed from by-products and optionally quantities of alkali still present or adhering salts by washing with inert, organic or aqueous-organic solvent mixtures, as e.g. alcohols, alcohol-water mixtures, ketones or ketone-water mixtures. When the etherification is a 2- or 3-stage process, the purification can be carried out after the first or second stage with organic-aqueous solvent mixtures. By using stoichiometric amounts of alkali-consuming reagents, as e.g. methyl chloride, ethyl chloride or benzyl chloride, a neutralization can be dispensed with. Owing to the catalytic amounts of alkali which may be present in the second or third stage, it is here also possible either to wash out the excess alkali with suitable inert, e.g. aqueous-alcoholic, solvent mixtures and so to avoid neutralization or in a neutralization to leave the small amounts of salts in the product and to dispense with a purification.

If the products have thermal flocculation points, purification with hot water at normal pressure or slight overpressure is advantageous.

The sulphoethyl-modified cellulose derivatives have very good acid- and alkali-stabilities and are in contrast to carboxymethyl cellulose derivatives excellently compatible with a large number of especially polyvalent cations (especially $Ca^{2+}$, $Al^{3+}$).

The sulphoalkylated, especially sulphoethylated, cellulose derivatives according to the invention are used as additives for gypsum- and cement-containing compounds. The amount of the product to be added to the gypsum- and cement-containing compounds depends on the specific application. In gypsum-based plaster compounds, the amount of additive to be added is preferably 0.05–0.5 wt %, related to the total dry compound, and in cement-based plaster compounds, on the other hand 0.02–0.3 wt %, related to the total dry compound. The amount to be added-to knifing fillers can, however, be higher. In gypsum-based knifing fillers it is in the range of 0.1–2 wt %, and in cement-based knifing fillers 0.1–1 wt %.

In the cellulose ethers according to the invention, the designations "DS" (degree of substitution) and "MS" (molar degree of substitution) have the usual meanings.

In each anhydroglucose unit of the cellulose molecule, three hydroxyl groups are present.

DS: average number of hydroxyl groups substituted in the cellulose per anhydroglucose unit.

MS: average number of moles of reactants combined with the cellulose per anhydroglucose unit.

In the following the invention is explained in more detail with the aid of preferred examples of operation as well as of comparative examples. (Parts=parts by weight).

Preparation of a Hydroxyethyl Sulphoethyl Cellulose From a Hydroxyethyl Cellulose (Example 1)

225 parts of a commercial hydroxyethyl cellulose (HEC, MS=2.5) with a moisture of 5.1% are added to a mixture of 8 parts acetone and 2 parts water. After 12 h the cellulose ether is filtered off, washed with about 2,000 parts of pure acetone and filtered off with powerful suction. The acetone-wet HEC is suspended in 2,180 parts tert-butanol in a cylindrical reaction vessel that is provided with a suitable agitator unit and can be suitably thermostated. The reactor is purged with nitrogen. After addition of 119.4 parts of a 51.4 wt % solution of sodium vinylsulphonate, the mixture is thoroughly intermixed for 15 min. Then 157 parts water and 15.7 parts sodium hydroxide prills are added and alkalization occurs for 30 min at 25° C. The mixture is heated to 75° C. over 60 min and this temperature maintained for 180 min. The batch is neutralized by addition of an equimolar amount of concentrated acetic acid. The product is filtered off and washed twice with 2,000 parts of a mixture of 8 parts acetone and 2 parts water and in addition with 2,000 parts pure acetone. The product is dried at 50° C. in an air-circulating drying cabinet.

Preparation of a Hydroxypropyl Sulphoethyl Cellulose From a Sulphoethyl Cellulose (Examples 3, 7, 9)

Preparation of the sulphoethyl cellulose (Examples 2, 8, Example of operation 6)

To a cylindrical reaction vessel, that is provided with a suitable agitator unit and suitably thermostated, 128.6 parts of a linters cellulose (moisture: 5.5%) are suspended in 2,188 parts isopropanol under a nitrogen atmosphere. After addition of 56.7 parts of a 51.6 wt % solution of sodium vinylsulphonate, the mixture is thoroughly intermixed for 15 min. Then 181.5 parts water and 45 parts sodium hydroxide prills are added and alkalization carried out for 80 min at 25° C. The mixture is heated to 75° C. over 60 min and this temperature maintained for 180 min. The batch is neutralized by addition of an equimolar amount of concentrated acetic acid. The product is filtered off and washed four times with 2,000 parts of a mixture of 8 parts acetone and 2 parts water and then in addition with 2,000 parts pure acetone. The product is dried at 50° C. in an air-circulating drying cabinet. The product preparation data for sulphoethyl celluloses nos. 2, 6, and 8 are listed in Table 1.

Preparation of Hydroxypropyl Sulphoethyl Cellulose (Example 7)

The sulphoethyl cellulose prepared above (Example 6) is added to about 2,000 parts of a mixture of 8 parts acetone and 2 parts water. After 12 h the cellulose ether is filtered off, washed with about 2,000 parts pure isopropanol and filtered off with powerful suction. 232 parts of the isopropanol-wet sulphoethyl cellulose is charged to a pressure reactor. The reactor is purged with nitrogen. 38 parts water and 16 parts of a 49.9% sodium hydroxide solution are injected with stirring. At 25° C., alkalization is carried out for 30 min. While continuously stirring, 280 parts propylene oxide are injected. The mixture is heated to 80° C. over 150 min.

This temperature is maintained for 60 min. After neutralization with an equimolar amount of concentrated acetic acid, the product is filtered off and washed three times with 2,000 parts of a mixture of 8.5 parts acetone and 1.5 parts water and then in addition with 2,000 parts pure acetone. The product is dried at 50° C. in an air-circulating drying cabinet. The product preparation data for hydroxypropyl sulphoethyl celluloses nos. 3, 7 and 9 follow from Table 1.

Preparation of a Hydroxypropyl Sulphoethyl Cellulose by the One-Pot Process (Examples 4 and 5, Example of Operation 4)

87.1 parts of a finely ground, bleached and refined spruce sulphite cellulose (moisture: 6.9%) are suspended in 1,066 parts tert-butanol in a pressure reactor with a blade agitator reaching to the wall. The reactor is purged with nitrogen. 101.5 parts water and 13.1 parts of a 49.5 wt % solution of sodium vinylsulphonate are added. The mixture is agitated for 15 min. 39.2 parts of a 50.1 wt % sodium hydroxide solution and 280 parts propylene oxide are injected and alkalization carried out for 80 min at 25° C. Then the mixture is heated over 60 min to 70° C. and this temperature maintained for 180 min. The product is neutralized with an equimolar amount of concentrated acetic acid. The product is filtered off and washed three times with 2,000 parts of a mixture of 8 parts methanol and 2 parts water and then in addition with 2,000 parts pure methanol. The product is dried at 50° C. in an air-circulating drying cabinet. The preparation data for hydroxypropyl sulphoethyl celluloses nos. 4 and 5 follow from Table 1.

Preparation of a Methyl Sulphoethyl Cellulose (Example 10)

68.6 parts of a finely ground, bleached and refined spruce sulphite cellulose (moisture: 5.5%) are suspended in 1,077 parts tert-butanol in a pressure reactor with a blade agitator reaching to the wall. The reactor is purged with nitrogen. 11.9 parts water and 118 parts of a 54.1 wt % aqueous solution of sodium vinylsulphonate are added and the mixture agitated for 15 min. 62.9 parts of a 50 wt % sodium hydroxide solution are injected. Alkalization occurs for 80 min at 25° C. Then 121 parts methyl chloride are injected and the mixture heated over 60 min to 70° C. This temperature is maintained for 180 min. After cooling to room temperature, the product is filtered off and washed four times with 2,000 parts of a mixture of 8 parts acetone and 2 parts water and finally in addition with 2,000 parts ethanol. The product is dried at 50° C. in an air-circulating drying cabinet.

Preparation of a Hydrophobically Modified Hydroxyethyl Sulphoethyl Cellulose Based on Hydroxyethyl Cellulose (Examples 11, 12, 15, 16, Example of Operation 14)

225 parts of a commercial hydroxyethyl cellulose (HEC, MS=2.5; moisture: 5.1%) are added to about 2.000 parts of a mixture of 8 parts acetone and 2 parts water. After 12 h the cellulose ether is filtered off and washed with about 2,000 parts of pure acetone. The cellulose ether is filtered off with powerful suction, and for the further reaction charged to a cylindrical reaction vessel that can be suitably thermostated and is provided with a suitable agitator unit. Under nitrogen atmosphere, the cellulose ether is suspended in 2,180 parts tert-butanol. 96 parts water, 169 parts of a 30.2 wt % aqueous solution of sodium vinylsulphonate and 18.3 parts of the hydrophobing agent (in this case isopropyl glycidyl ether) are added. The mixture is thoroughly agitated for 15 min. After addition of 15.7 parts sodium hydroxide prills, alkalization occurs for 30 min at 25° C. The mixture is heated in 60 min to 75° C. and etherification occurs for 180 min at this temperature. The batch is neutralized by addition of an equimolar amount of concentrated acetic acid, the product is filtered off and washed four times with 2,000 parts of a mixture of 8 parts acetone and 2 parts water and then in addition with 2,000 parts pure acetone. The product is dried at 50° C. in an air-circulating drying cabinet. The product preparation data for Examples 11, 12, 14, 15 and 16 follow from Table 1.

Preparation of a Hydroxyethyl Hydroxypropyl Sulphoethyl Cellulose (Example 13)

87.1 parts of a finely ground, bleached and refined spruce sulphite cellulose (moisture: 6.9%) are suspended in 1,066 parts tert-butanol in a pressure reactor with a blade agitator reaching to the wall. The reactor is purged with nitrogen. 12.9 parts of a 50.5 wt % aqueous solution of sodium vinylsulphonate and 137.6 parts water are added and the mixture agitated for 15 min. 30 parts sodium hydroxide prills are added. After alkalization has occurred for 60 min at 25° C., 11 parts ethylene oxide and 116 parts propylene oxide are injected. The reaction mixture is heated over 100 min to 80° C. This temperature is maintained for 180 min. The mixture is neutralized with an equimolar amount of concentrated acetic acid, and the product filtered off and washed three times with 2,000 parts of a mixture of 8 parts acetone and 2 parts water and finally in addition with pure acetone. The product is dried at 50° C. in an air-circulating drying cabinet.

The cellulose ethers claimed according to the invention were tested with a fully formulated gypsum machine plaster (anhydrite-plaster, limestone sand, hydrated lime, retarder). The composition of the plaster system can contain, besides the anionic cellulose derivative, further additives which improve the properties and the rheological behaviour of the plaster system. Usable as additives are e.g. retarders, setting accelerators, defoamers, air void formers and hydrophobing agents (see also: I. Schrage in "Ullmann's Encyclopädie der technischen Chemie", Bd. 9, Verlag Chemie, Weinheim/N.Y., 1974, p 312 ff and literature quoted therein).

In the tables presented below, quantities quoted are parts by weight. Viscosities were measured with a Haake rotary viscometer, Type RV 100, System M 500, measuring device MV according to DIN 53,019, at a shear rate of $D=2.5$ s$^{-1}$ at a temperature of 20° C. In each case a 2 wt % solution in distilled water was measured. The cellulose ethers were screened by means of a screening machine with screens according to DIN 4188. The following two fractions were then allocated to the plaster system:

45% <0.063 mm

55% <0.25 mm

For testing, a fully formulated gypsum machine plaster was prepared, and the consistency determined according to DIN 18,555, Part 2 by determining the degree of spread. The water retention value was determined according to DIN 18,555, Part 7. The water-solid value was standardized. The sulphoethyl-substituted cellulose derivatives claimed according to the invention were each compared with a commercial methyl hydroxyethyl cellulose of corresponding viscosity. In Table 1 the preparation conditions are listed, in Table 2 the degrees of substitution and in Table 3 the results of testing of various sulphoethyl-substituted cellulose derivatives by comparison with a commercial methyl hydroxyethyl cellulose (Walocel® M) of comparable viscosity. The results are in each case the mean of two measurements.

TABLE 1

Sulphoethyl-modified cellulose ethers: Preparation data

| No. | tert-Butanol (parts) | Linters cellulose (parts) | Cellulose ether HEC[3] (parts) | SEC[4] (parts) | VSSNa solution[5] (parts) | (wt %) | NaOH solution (parts) | (wt %) |
|---|---|---|---|---|---|---|---|---|
| 1 | 2,180 | — | 225 | — | 119.4 | 51.4 | 15.7 | 100 |
| 2 | 2,192 | 134.6 | — | — | 19.4 | 52.7 | 47.2 | 100 |
| 3 | — | — | — | 215 | — | — | 16.0 | 100 |
| 4 | 1,066 | 87.1[2] | — | — | 13.1 | 49.5 | 39.2 | 50.1 |
| 5 | 1,066 | 87.1[2] | — | — | 13.1 | 49.5 | 39.2 | 50.1 |
| 6 | 2,188[1] | 128.6 | — | — | 56.7 | 51.6 | 45.0 | 100 |
| 7 | — | — | — | 232 | — | — | 16.0 | 49.9 |
| 8 | 2,188[1] | 128.6 | — | — | 113.9 | 51.4 | 45.0 | 100 |
| 9 | — | — | — | 312 | — | — | 16.0 | 49.9 |
| 10 | 1,077 | 68.6[2] | — | — | 118 | 54.1 | 62.9 | 50.0 |
| 11 | 2,325 | — | 225 | — | 59.5 | 51.6 | 15.7 | 100 |
| 12 | 2,325[1] | — | 225 | — | 59.5 | 51.6 | 15.7 | 100 |
| 13 | 1,066 | 87.1[2] | — | — | 12.9 | 50.5 | 30.0 | 100 |
| 14 | 2,180 | — | 225 | — | 169.0 | 30.2 | 15.7 | 100 |
| 15 | 2,180 | — | 226 | — | 169.2 | 30.2 | 15.7 | 100 |
| 16 | 2,180 | — | 226 | — | 169.2 | 30.2 | 15.7 | 100 |

| No. | Reagent[6] IPGE | n-BGE | PO (parts) | BO | ME | EO | $H_2O$ (parts) | Alkalizing time (min) | Heating up time (min) | Reaction Time (min) | Temp. (°C.) |
|---|---|---|---|---|---|---|---|---|---|---|---|
| 1 | — | — | — | — | — | — | 157 | 30 | 60 | 180 | 75 |
| 2 | — | — | — | — | — | — | 193.6 | 80 | 60 | 120 | 80 |
| 3 | — | — | 175 | — | — | — | 54.0 | 30 | 150 | 60 | 80 |
| 4 | — | — | 280 | — | — | — | 101.5 | 80 | 60 | 180 | 70 |
| 5 | — | — | 280 | — | — | — | 101.5 | 80 | 60 | 180 | 70 |
| 6 | — | — | — | — | — | — | 181.5 | 80 | 60 | 180 | 75 |
| 7 | — | — | 280 | — | — | — | 38.0 | 30 | 150 | 60 | 80 |
| 8 | — | — | — | — | — | — | 153.6 | 80 | 60 | 180 | 75 |
| 9 | — | — | 280 | — | — | — | 38.0 | 30 | 150 | 60 | 80 |
| 10 | — | — | — | — | 121 | — | 11.9 | 80 | 60 | 180 | 70 |
| 11 | — | — | — | 339 | — | — | 13.6 | 30 | 60 | 60 | 75 |
| 12 | — | — | — | 113 | — | — | 13.6 | 30 | 60 | 300 | 75 |
| 13 | — | — | 116 | — | — | 11 | 137.6 | 60 | 100 | 180 | 80 |
| 14 | 18.3 | — | — | — | — | — | 96.0 | 30 | 60 | 180 | 75 |
| 15 | 54.8 | — | — | — | — | — | 96.3 | 30 | 60 | 180 | 75 |
| 16 | 73.0 | — | — | — | — | — | 96.3 | 30 | 60 | 180 | 75 |

[1] Isopropanol
[2] Spruce sulphite cellulose
[3] Hydroxyethyl cellulose (MS = 2.5) (moisture: 5.1%)
[4] Sulphoethyl cellulose
[5] Sodium vinylsulphonate solution
[6] IPGE: Isopropyl glycidyl ether
n-BGE: n-Butyl glycidyl ether
PO: Propylene oxide
BO: Butylene oxide
ME: Methyl chloride
EO: Ethylene oxide

TABLE 2

Sulphoethyl-modified cellulose ethers
Degrees of substitution

| No. | Cellulose ether | $DS_{SE}$[1] | $MS_{ME}$[2] | $MS_{HP}$[3] | $MS_{HB}$[4] | $MS_{IP}$[5] | $DS_{OCH3}$[6] |
|---|---|---|---|---|---|---|---|
| 1 | Hydroxyethyl sulphoethyl cellulose | 0.07 | 2.43 | — | — | — | — |
| 3 | Hydroxypropyl sulphoethyl cellulose | 0.05 | — | 1.96 | — | — | — |
| 4 | Hydroxypropyl sulphoethyl cellulose | 0.06 | — | 1.54 | — | — | — |
| 5 | Hydroxypropyl sulphoethyl cellulose | 0.06 | — | 1.52 | — | — | — |
| 7 | Hydroxypropyl sulphoethyl cellulose | 0.17 | — | 2.67 | — | — | — |
| 9 | Hydroxypropyl sulphoethyl cellulose | 0.30 | — | 2.59 | — | — | — |
| 10 | Methyl sulphoethyl cellulose | 0.45 | — | — | — | — | 1.13 |
| 11 | Hydroxyethyl hydroxybutyl sulphoethyl cellulose | 0.11 | 3.07 | — | 0.29 | — | — |
| 12 | Hydroxyethyl hydroxybutyl sulphoethyl cellulose | 0.16 | 3.17 | — | 0.34 | — | — |
| 13 | Hydroxyethyl hydroxypropyl sulphoethyl cellulose | 0.04 | 0.63 | 0.69 | — | — | — |
| 14 | 3-(2'-methyl)ethoxy-2-hydroxypro- | 0.24 | 3.2 | — | — | — | 0.058 |

TABLE 2-continued

| | | Sulphoethyl-modified cellulose ethers Degrees of substitution | | | | | |
|---|---|---|---|---|---|---|---|
| No. | Cellulose ether | $DS_{SE}$[1] | $MS_{ME}$[2] | $MS_{HP}$[3] | $MS_{HB}$[4] | $MS_{IP}$[5] | $DS_{OCH_3}$[6] |
| | pyl hydroxyethyl sulphoethyl cellulose | | | | | | |
| 15 | 3-(2'-methyl)ethoxy-2-hydroxypropyl hydroxyethyl sulphoethyl cellulose | 0.26 | 3.5 | — | — | — | 0.21 |
| 16 | 3-(2'-methyl)ethoxy-2-hydroxypropyl hydroxyethyl sulphoethyl cellulose | 0.31 | 3.6 | — | — | — | 0.295 |

[1] Average degree of substitution by sulphoethyl groups
[2] Molecular degree of substitution by hydroxyethyl groups
[3] Molecular degree of substitution by hydroxypropyl groups
[4] Molecular degree of substitution by hydroxybutyl groups
[5] Molecular degree of substitution by 3-(2'-methyl)ethoxy-2-hydroxypropyl groups
[6] Average degree of substitution by methyl groups

TABLE 3

Sulphoethyl-modified cellulose ethers
Application technology testing in the building materials field

| | | | | | | Comparative sample[5] | | |
|---|---|---|---|---|---|---|---|---|
| No. | Cellulose ether | Viscosity[1] (mPa·s) | W/F[2] | ABM[3] (mm) | WRV[4] (%) | W/F[2] | ABM[3] (mm) | WRV[4] (%) |
| 1 | Hydroxyethyl sulphoethyl cellulose | 16,900 | 0.48 | 168 | 94.2 | 0.48 | 172 | 92.7 |
| 3 | Hydroxypropyl sulphoethyl cellulose | 9,250 | 0.46 | 168 | 94.7 | 0.46 | 166 | 92.0 |
| 4 | Hydroxypropyl sulphoethyl cellulose | 17,050 | 0.48 | 172 | 94.5 | 0.48 | 172 | 92.7 |
| 5 | Hydroxypropyl sulphoethyl cellulose | 30,820 | 0.46 | 163 | 96.8 | 0.46 | 163 | 96.2 |
| 7 | Hydroxypropyl sulphoethyl cellulose | 12,580 | 0.46 | 172 | 95.8 | 0.46 | 166 | 92.0 |
| 9 | Hydroxypropyl sulphoethyl cellulose | 12,830 | 0.46 | 172 | 97.4 | 0.46 | 166 | 92.0 |
| 10 | Methyl sulphoethyl cellulose | 11,800 | 0.46 | 170 | 96.3 | 0.46 | 166 | 92.0 |
| 11 | Hydroxyethyl hydroxybutyl sulphoethyl cellulose | 13,020 | 0.46 | 168 | 93.8 | 0.46 | 166 | 92.0 |
| 12 | Hydroxyethyl hydroxybutyl sulphoethyl cellulose | 10,150 | 0.46 | 173 | 93.2 | 0.46 | 166 | 92.0 |
| 13 | Hydroxyethyl hydroxypropyl sulphoethyl cellulose | 11,470 | 0.46 | 171 | 93.2 | 0.46 | 166 | 92.0 |
| 14 | 3-(2'-methyl)ethoxy-2-hydroxypropyl hydroxyethyl sulphoethyl cellulose | 25,083 | 0.46 | 163 | 98.2 | 0.46 | 166 | 94.6 |
| 15 | 3-(2'-methyl)ethoxy-2-hydroxypropyl hydroxyethyl sulphoethyl cellulose | 20,660 | 0.48 | 167 | 95.1 | 0.48 | 172 | 92.7 |
| 16 | 3-(2'-methyl)ethoxy-2-hydroxypropyl hydroxyethyl sulphoethyl cellulose | 21,020 | 0.48 | 159 | 93.7 | 0.48 | 172 | 92.7 |

Explanatory notes to Table 3
[1] Vicosity of a 2 wt % solution at 20° C., measured with a Haake rotary viscosity, Type RV 100, at a shear rate of $D = 2.5 \, s^{-1}$.
[2] Water-solid factor
[3] Degree of spread
[4] Water retention value
[5] Methyl hydroxyethyl cellulose, Walocel ® M (Wolff Walsrode AG)

We claim:

1. A composition comprising
   (A) at least one of gypsum and cement, and
   (B) cellulose etherified with
      (i) sulphoalkyl radicals, and
      (ii) at least two radicals selected from the group consisting of hydroxyalkyl, alkoxyhydroxyalkyl, aryl and arylalkyl radicals.

2. A composition according to claim 1, wherein (B) contains sulphoalkyl radicals with a degree of substitution of 0.001 to 0.6.

3. A composition according to claim 1, wherein (B) contains sulphoalkyl radicals with a degree of substitution of 0.01 to 0.5.

4. A composition according to claim 1, wherein (B) contains hydroxyethyl radicals.

5. A composition according to claim 4, wherein (B) contains other hydroxyalkyl radicals.

6. A composition according to claim 4, wherein (B) contains hydroxypropyl radicals.

7. A composition according to claim 4, wherein (B) contains dihydroxypropyl radicals.

8. A composition according to claim 1, wherein (B) contains a 3-alkoxy-2-hydroxyalkyl radical.

* * * * *